April 24, 1962  C. E. GARTNER, JR  3,031,642
SAFETY TEST CLIP
Filed May 11, 1960

INVENTOR
CHARLES E. GARTNER, JR.
BY
ATTORNEY

United States Patent Office

3,031,642
Patented Apr. 24, 1962

3,031,642
SAFETY TEST CLIP
Charles E. Gartner, Jr., 306 W. Rosemar St.,
Philadelphia, Pa.
Filed May 11, 1960, Ser. No. 28,509
1 Claim. (Cl. 339—261)

This invention relates to test clips used principally for connecting the leads of test apparatus to so-called test ears of a switch interposed in the electrical circuit to be tested.

This application is a continuation-in-part of my copending application, Serial No. 679,715, filed August 22, 1957, and now abandoned entitled "Safety Test Clip."

In many industrial installations and power generating stations it is necessary to periodically test various circuits to determine the current being transmitted thereby, for example, in a power generating station circuits leading from transformers to relays, and to facilitate these tests there is usually interposed in each circuit a test switch provided with, normally corrugated, test ears on opposite poles of the switch for temporary attachment of the leads running to the testing instrument, such as an ammeter, so that after the leads are connected to the ears respectively and the switch opened, current flowing through the circuit is diverted through the instrument while the test is being made. The free end of each lead may be provided with a connector having a hole or slot to enable a screw and nut connection to be made with the test ear which is normally provided with a corresponding hole, or the bared extremity of the lead conductor may be similarly connected with it, but this method of attachment of the lead preparatory to the test and its subsequent removal is a time consuming operation which constitutes a material cost factor when, as is common in large generating stations, a great many tests must be made every day. It therefore is customary to provide the ends of the leads with spring clips of the general type disclosed in United States Letters Patent 1,999,613, granted April 30, 1935, which can be attached to and detached from the test ears in a minimum time and when so attached effect adequate electrical connection therewith.

It will of course be appreciated that when the circuit is in normal operation the interposed test switch is kept closed and only opened momentarily while the test is being made and after the test leads have been attached to its test clips, and it is consequently essential in the interest of safety that the securement of the clips to the ears be of a character to inhibit their accidental detachment therefrom. But a spring clip of the type just mentioned readily can be separated from the ear by an accidental pull on the lead which carries the clip with consequent opening of the circuit being tested if its interposed switch is likewise open; this not only renders the test abortive until the clip can be reattached to the ear but may seriously damage one or more of the interconnected instrumentalities such as a current transformer through the opening of its secondary circuit while the primary circuit is carrying full load; additionally, the loose lead by contact with other adjacent apparatus may cause injury thereto or even to personnel.

It is therefore an object of my invention to provide a safety test clip of the general type of that disclosed in Patent 1,999,613 but which comprises means effective to prevent accidental detachment of the clip from the test ear.

A further object is the provision of such a safety test clip which can be produced at slight, if any, increase in cost over that of generally like clips devoid of my improvement, yet which can be connected to or disconnected from a test ear as readily and in substantially the same manner as such clips.

Further objects and novel features of design, construction and arrangement comprehended by my invention are hereinafter more particularly pointed out or will be apparent from the following description of a preferred embodiment thereof during which reference will be had to the accompanying drawing in which.

Figure 3:
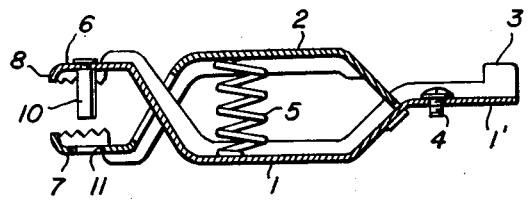
Figure 4:
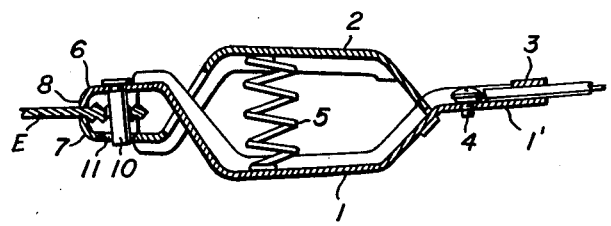
Figure 5:
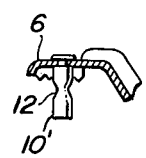

FIG. 3 on a larger scale is a central longitudinal section of the clip alone, with certain parts shown in elevation, preparatory to its attachment to a lead and with its jaws open;

FIG. 4 is a similar view of the clip with its jaws closed upon a test ear after attachment of the lead, and FIG. 5 is a fragmentary sectional view of a modified form of the pin mounted in one of the jaws of the clip.

Figure 1:
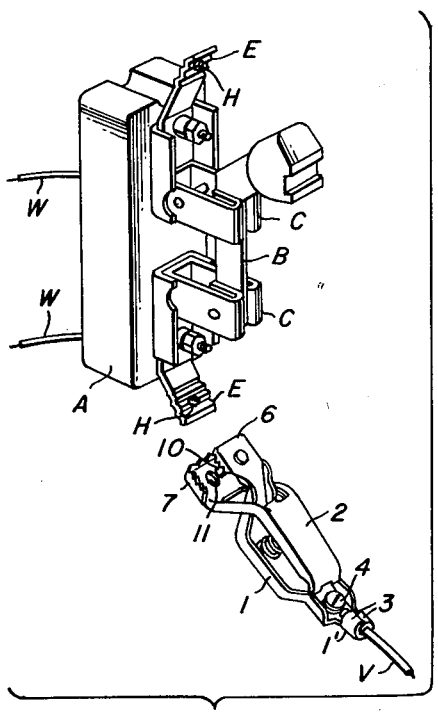
FIG. 1 is a perspective view of a test switch of usual type interposed in a circuit in closed position and also showing one of my clips and a portion of its attached lead just prior to securement on the lower ear of the switch.
Figure 2:
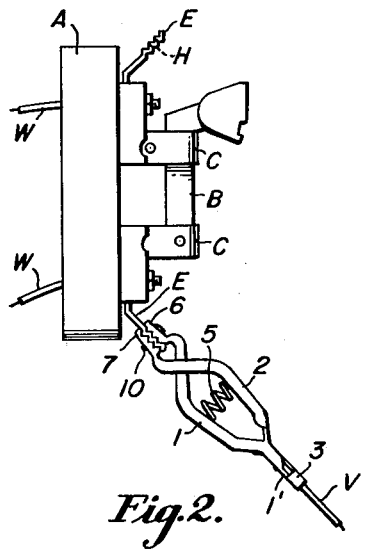
FIG. 2 is a side elevation of the switch with the clip secured to said ear.

The test switch shown in FIGS. 1 and 2 is of ordinary well known construction comprising the usual insulating base A, a pivoted metallic blade B spanning spaced contacts C when the switch is closed and outwardly swingable to open it, and metallic test ears E—E respectively associated with the contacts, the ears being corrugated and provided with the customary hole H to which reference has been made, the circuit in which the switch is interposed being indicated by wires W. It will of course be understood, however, that the switch illustrated and just briefly described is but typical of any switch or instrumentality to which one or more of the clips of my invention are to be detachably connected through the medium of perforated, and usually corrugated, ears forming components of it.

The clip itself in general comprises two members 1, 2 conveniently formed of sheet metal stampings, preferably copperplated steel or hardened copper, member 1 having a rearward extension 1' carrying spaced lugs 3 and provided with a threaded aperture for reception of a screw 4 for clamping the end of the conductor in the lead V to the clip preparatory to bending lugs 3 over the lead to firmly secure the clip and lead together. Forwardly of extension 1' member 2 is hingedly secured to member 1 in any suitable manner and forwardly of this point of connection the members are oppositely bent outwardly to form an open space between them in which is seated an expansion spring 5 which biases them apart. Beyond the spring, however, the members are bent oppositely inward and crossed and at their extremities respectively provided with jaws 6, 7 each desirably provided with an inturned peripheral toothed flange 8 designed to enhance the grip of the jaws on the test ear when associated therewith and insure good electrical contact, all as more fully disclosed in said Patent 1,999,613, the arrangement being such that the biasing effect of the spring causes the jaws to remain closed under normal conditions, manually inwardly exerted pressure applied to the spaced portions of the members in the vicinity of the spring being effective to move them toward each other and thus open the jaws substantially as shown in FIG. 3 to permit insertion of a test ear or like element between them to be subsequently gripped by the jaws when the aforesaid pressure is released. Since the construction and operation of my clip as so far described are substantially similar to those of clips commonly in use further description thereof would be superfluous.

In accordance with my invention, however, I provide means for positively preventing accidental detachment of the clip from a perforated test ear or the like when it is operatively associated therewith, said means comprising a strong metallic pin 10, preferably of brass, fixed to one of the jaws 6, 7 as by riveting as shown, although other ways of securement may be utilized if preferred, in such manner that it extends inwardly from the jaw toward the opposite jaw in which, in turn, I provide a hole 11 aligned with and of diameter to freely receive the pin which is of sufficient length to project beyond the outer face of the latter jaw when the jaws are closed either upon each other or upon a test ear. The pin 10 is of substantially uniform cross section throughout the portion which extends inwardly from the jaw 6, as illustrated in FIG. 3. The diameter of the pin is of course such that it likewise will pass through the hole in the ear so that when the open clip is applied thereto and the manual opening pressure on members 1, 2 then released, the pin during the closing of the jaws first passes through the hole in the ear and then enters the hole 11 as the jaws close on the ear. It results that the clip is then securely locked to the ear and cannot be accidentally detached therefrom by a pull on the lead with which it is connected or otherwise, although by pressing the members together in the vicinity of spring 5 so as to open the jaws in the normal way the pin may be withdrawn from the hole in the ear and ample clearance afforded between its end and the ear to enable the clip to be removed from the latter.

For maximum assurance that the clip will not become detached from the test ear by a pull on the conductor, it is important that the pin 10 be positively engaged in the hole 11 and perferably extend therethrough. Referring particularly to FIG. 4, it is obviously apparent that when the pin 10 is engaged in the hole 11 tension applied to the lead V will be equally distributed between the jaws and because of the crossed configurations of the members 1 and 2 this tension will increase the pressure of the jaws on the test ear. In contrast, if the pin were to be engaged in the aperture H in the test ear and not engaged in the hole in the opposing jaw, a pull on the lead would put full tension only on the jaw to which the pin was attached, with the possibility that a strong pull would deform this jaw enough to allow the clip to disengage from the test ear.

The pin 10, throughout the portion which extends inwardly from the jaw 6 is of substantially uniform cross section so that when tension is applied to the lead V attached to the lug 3 (as shown in FIG. 2) the pin will perpendicularly engage the rim of the hole H with substantially no unbalanced transverse components of force which would tend to cause the pin to slide axially in the hole H and force the jaws apart.

It is important that the pin 10 have substantially the same cross-sectional area adjacent the inner face of each jaw, to prevent occurrence of such unbalanced components of force. To illustrate this, a test was made in which two test ears were bolted together at their inner ends so that their corrugated ends extended outwardly in opposite directions. Each of the corrugated ends was grasped by a clip similar to that of FIG. 3, identical with each other except that in one the pin had been tapered as illustrated in United States Letters Patent 1,221,524, granted April 3, 1917. Tension was then applied to leads attached to the two clips with the result that the clip provided with the tapered pin let go at a pull of ten pounds due to unbalanced side thrust forcing the jaws open, while the clip of FIG. 3 retained its normal grip on the test ear with the test ear centered between the jaws of the clip.

In place of the pin 10 which has a substantially uniform cross section inwardly from the jaw 6, the modified pin 10', illustrated in FIG. 5, may be used. Pin 10' is narrowed at the central portion 12 to assure centering of the test ear E between the jaws of the clip engaged therewith, when tension is applied to the lead V at a sharp angle to the general direction of the test ear E.

A tension test was made on an assembly represented in FIG. 2 by pulling on the lead until the members 1 and 2 were strained well beyond the elastic limit. Upon release of tension it was found that the permanent deformation was such that the spring 5 was compressed to approximately one-half its initial length, indicating approximate doubling of the pressure of the jaws on the test ear. There was no apparent off-centering of the test ear in the clip even at a tension of 300 lbs.

The data for this test up to 300 lbs., made on two representative specimens of the copper-plated steel test clip having a brass pin, is shown in Table I, following:

Table I

| Specimen No. | Minimum Force Required to Loosen Clip from Test Ear | | Length of Spring [1] with Jaws of Clip in Contact with Each Other | |
|---|---|---|---|---|
| | Before Test, lb. | After Applying 300 lb. Tension, lb. | Before Test, in. | After Applying 300 lb. Tension, in. |
| 1 | 5.8 | 11.9 | 0.55 | 0.32 |
| 2 | 6.2 | 11.4 | 0.54 | 0.29 |

[1] The length of the spring was determined by measuring the external dimension of the clip at the location confining the spring, and subtracting the thickness of the confining members (each 0.045 in. thick).

When used on a perforated test ear, my clip has another very important advantage over the test clip disclosed in the aforementioned Patent 1,999,613. In case a very low resistance connection is desired in the assembly shown in FIG. 2, it is merely necessary to apply tension to the conductor or lead V. As the force is increased the first result is to slip the grip of the clip until the pin 10 presses against the outward edge of the hole H of the test ear, thus lowering the resistance by providing a firm pressure engagement at this point. Further increase of the pulling force results in a tendency to tighten the grip of the jaws and thus provide still further pressure contact and still lower resistance.

Tests were made of the electrical resistance of the connection between a representative copper-plated steel test clip of my invention and a fixed copper test ear to which it was attached, as increasing tensile force was applied to a conductor attached to the clip. A Kelvin bridge was used to measure the resistances, with potential points taken about one-half inch longitudinally from the front end of the clip along the test ear and one of the jaws, respectively. Results of such tests on one clip, typical of this type of contact, are shown in Table II, following:

Table II

| Tensile force applied to clip, Lb. | Electrical resistance of connection between clip and test ear measured with Kelvin Bridge, Ohms |
|---|---|
| 0 | 0.000453 |
| 10 | 0.000363 |
| 20 | 0.000360 |
| 30 | 0.000311 |
| 40 | 0.000275 |
| 50 | 0.000249 |
| 60 | 0.000231 |

It is evident from Table II that resistance of the contact between the clip and the test ear was progressively reduced as the tension was increased. Similar tension tests with conventional test clips, identical with the device of my invention except for omission of the pin 10 and aperture 11, showed that the conventional test clip slipped off from the test ear at an average pull of approximately 10 pounds.

Thus while engagement of the teeth on flanges 8 with the opposite faces of the ear when my clip is attached thereto insures adequate electrical connection between the parts it is not relied upon as in the clips commonly in use to maintain the clip from accidental displacement from the ear. But once the attachment of the respective leads of the testing instrument to the ears of the switch is effected through the medium of my clips the latter are each locked to the respective ears through the medium of the pin which in turn is securely supported by the clip jaws and the circuit cannot be interrupted accidentally after opening of the switch with the inimical consequences to which reference has been made.

While I have herein described a preferred embodiment of my invention with considerable particularity I do not thereby desire or intend to restrict or confine myself specifically thereto or to any particular use or employment of my safety test clip since it will be understood that it is applicable to numerous situations in which a positive but readily detachable connection to a perforated member is required, while various modifications in the design, construction and arrangement of the parts of the clip may be made if desired without departing from the spirit and scope of the invention as defined in the appended claim.

Having thus described my invention I claim and desire to protect by Letters Patent of the United States:

In combination, an electric conductor, a generally flat metallic test ear having a transverse aperture, and a safety spring clip connector for effecting electrical connection between said conductor and said test ear, said clip comprising a pair of metallic members hingedly connected adjacent respective ends thereof, said conductor being secured to one of said members and said members respectively carrying opposed jaws at the ends remote from the hinge and mutually crossing each other between said jaws and the hinge, a spring for closing said jaws by biasing said members apart at a point between their point of crossing and the hinge, and a strong metallic pin attached to one of said jaws, directed toward the other jaw and of substantially the same cross sectional area, adjacent the inner face of each jaw, said other jaw being provided with an opening therethrough for freely receiving said pin, said jaws being closed upon said test ear with said pin extending through said aperture and into said opening whereby said clip is locked by said pin against being pulled away from engagement with said test ear by tension on said conductor and under said tension providing a pressure engagement between said pin and the margin of said aperture thereby lowering the electrical resistance between said test ear and said conductor, and said members being movable against the bias of said spring to separate said jaws and release said pin from engagement with said test ear.

References Cited in the file of this patent

UNITED STATES PATENTS

| | | |
|---|---|---|
| 775,284 | Frankel | Nov. 15, 1904 |
| 1,221,524 | Frankel | Apr. 3, 1917 |
| 1,237,718 | Speice | Aug. 21, 1917 |
| 1,965,151 | Mueller | July 3, 1934 |
| 1,999,613 | Mueller et al. | Apr. 30, 1935 |
| 2,569,972 | Benner et al. | Oct. 2, 1951 |

FOREIGN PATENTS

| | | |
|---|---|---|
| 189,641 | Great Britain | Dec. 7, 1922 |
| 581,410 | France | Sept. 29, 1924 |
| 846,572 | Germany | Aug. 14, 1952 |